Figure 1:
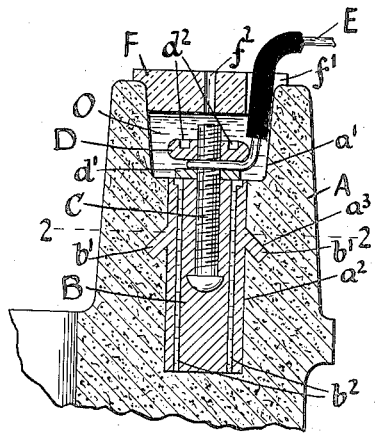

J. H. GUGLER.
BATTERY CONNECTOR.
APPLICATION FILED JAN. 22, 1909.

1,005,199.

Patented Oct. 10, 1911.

3 SHEETS—SHEET 1.

Witnesses
A. Y. Andrews.
Josephine Healy

Julius H. Gugler, Inventor
By George Wetmore Colles
Attorney

J. H. GUGLER.
BATTERY CONNECTOR.
APPLICATION FILED JAN. 22, 1909.

1,005,199.

Patented Oct. 10, 1911.
3 SHEETS—SHEET 2.

Julius H. Gugler, Inventor

Witnesses
A. F. Andrews.
Josephine Healy

By George Wetmore Colles
Attorney

UNITED STATES PATENT OFFICE.

JULIUS H. GUGLER, OF MILWAUKEE, WISCONSIN.

BATTERY-CONNECTOR.

1,005,199.  Specification of Letters Patent.  Patented Oct. 10, 1911.

Application filed January 22, 1909. Serial No. 473,637.

*To all whom it may concern:*

Be it known that I, JULIUS H. GUGLER, of Milwaukee, Wisconsin, have invented a Battery-Connector, of which the following is a specification.

This invention relates to electric batteries more particularly primary batteries, and has for its object to provide an improved non-corrosive connector which is especially adapted for use upon the carbon element of the battery. As is well known, it is a very difficult matter to form a satisfactory connection between the carbon element and the battery circuit for the reason that carbon is a non-metallic element, hence does not alloy or form anything more than mechanical contact with metal and furthermore, is to a certain degree porous and absorbent, so that it permits the vapors from the acids and other chemicals used in the battery to penetrate the substance of the carbon and corrode the metal where it is in contact with it, thus impairing the electric continuity of the circuit. Furthermore it is the case with all kinds of battery terminals, whether on carbon or metal elements, that the acid fumes corrode the copper or brass posts and terminal-plates, even between the contact of the wire and terminal, or in two metal parts, so as to impair their contact; and further corrodes the surface of the exposed metal parts generally so as to impair the appearance and neatness of the same and gradually to destroy them. This is particularly true in the case of those batteries which contain strong depolarizing chemicals such as free-chlorin or nitric acid, which tends to prevent the use of such reagents in commercial practice.

It is the object of the present invention to provide means for obviating these difficulties and maintaining at all times perfect contact between the carbon and metal terminal thereof, as well as between the latter and the wire; and further, to provide a removable binding post or terminal for the carbon which, if corroded, can be removed from the latter at any time and replaced by a new one.

I further aim in general to provide such a removable terminal or binding post not simply for the carbon element of primary batteries, but for either of the elements of primary or secondary batteries.

My invention comprises as one of its main features a means of surrounding and impregnating the parts in contact between the terminal and battery element with oil or similar nonpermeable or impervious and non-corrodible liquid; and secondarily, to provide an oil-submerged binding-post for the contact between the terminal and circuit-lead.

There are numerous ways in which the principles of my invention may be carried out, each of which may be the most practical for certain circumstances of use.

I have illustrated in the accompanying drawings some of the principal forms which the invention may assume.

Figure 3:
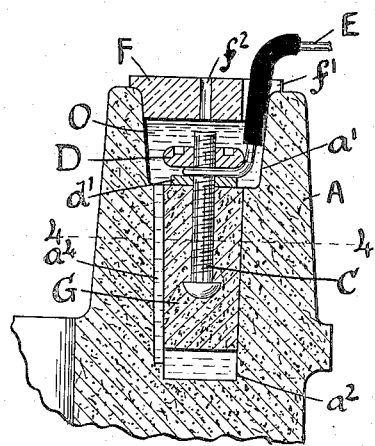
Figure 2:
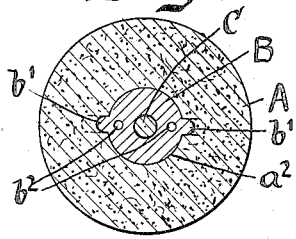
Figure 4:
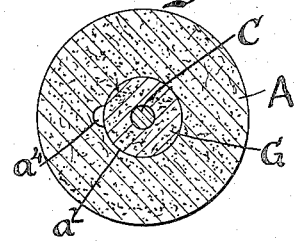
Figure 5:
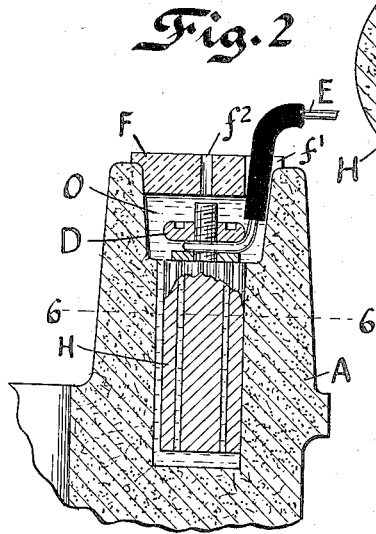
Figure 6:
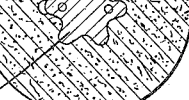
Figure 7:
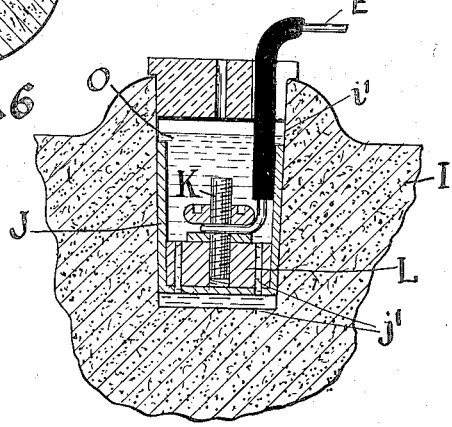
Figure 8:
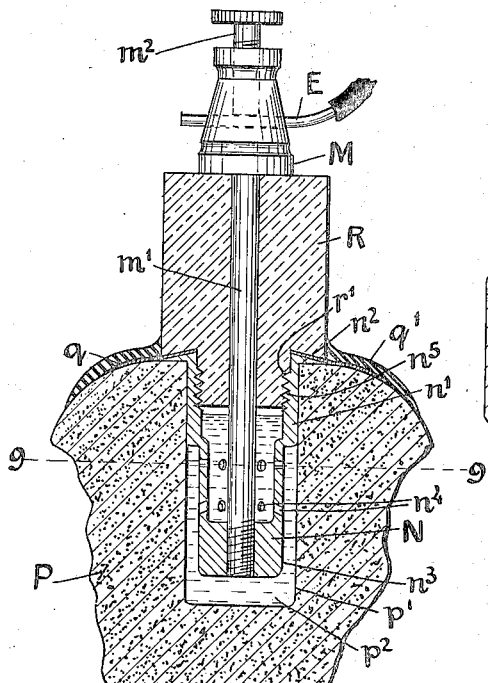
Figure 10:
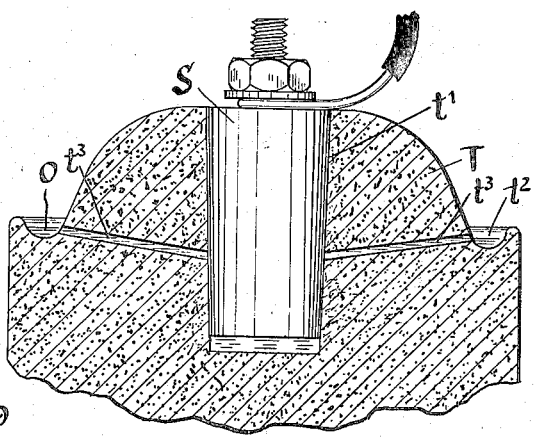
Figure 9:
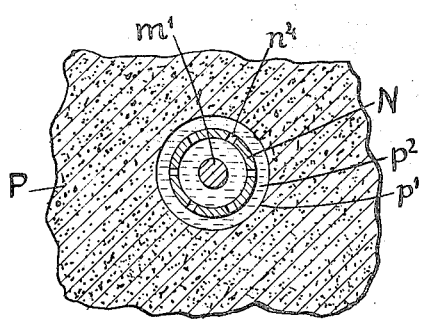
Figure 11:
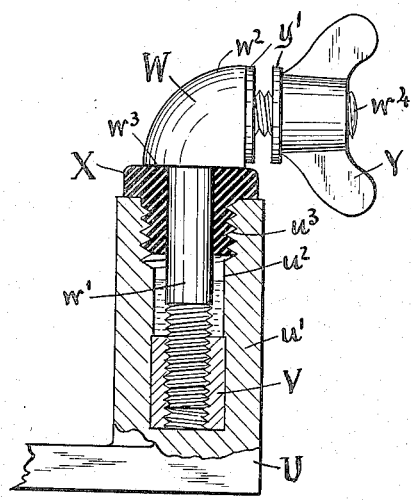
Figure 12:
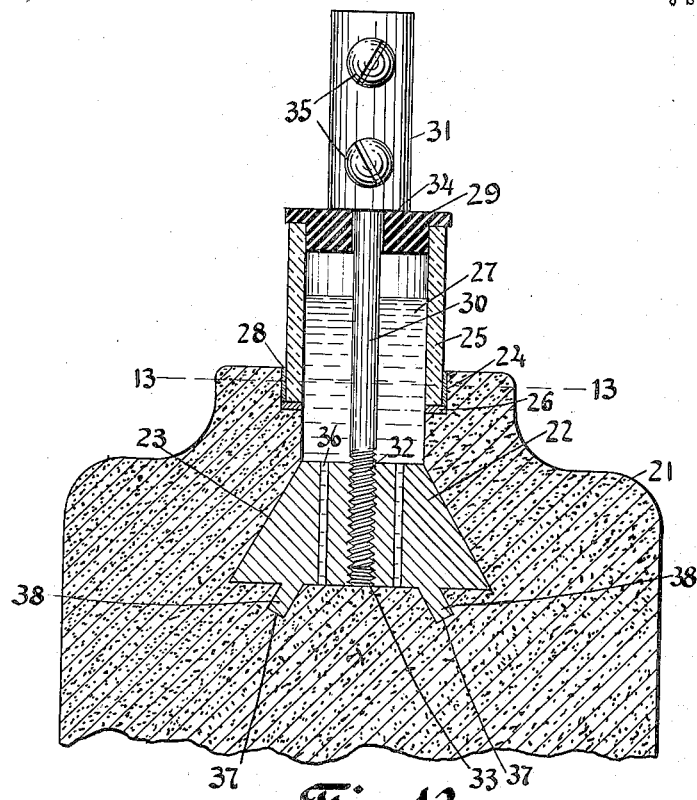
Figure 13:
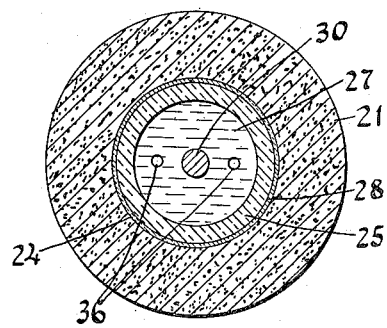

In these drawings, Figure 1 is a longitudinal section of a battery element (the element here shown is supposed to be of carbon) provided with my improved connector. Fig. 2 is a transverse section thereof on the plane 2. Fig. 3 is a longitudinal section through a portion of a battery element provided with a different form of connector. Fig. 4 is a plan-section thereof taken on the plane 4. Fig. 5 is a longitudinal section through a portion of a battery element showing a third form of connector. Fig. 6 is a plan section thereof on the plane 6. Fig. 7 is a longitudinal section through a portion of a battery element showing a fourth form of connector. Fig. 8 is a longitudinal section through a portion of a battery element showing a fifth form of connector. Fig. 9 is a plan section thereof on the plane 9. Fig. 10 is a longitudinal section through a portion of a battery element showing a sixth form of connector. Fig. 11 is a longitudinal section through a portion of a battery element showing a seventh form of connector, this battery being adapted more particularly to storage battery - plates and other metal elements. Fig. 12 is a longitudinal section through a battery element showing an eighth form of connector; and Fig. 13 is a plan section therethrough taken on the plane 13.

In these drawings every reference letter and numeral refers always to the same part.

The principle of the invention may be best understood by describing the concrete forms successively.

In the first forms, Figs. 1 and 2, is shown the terminal-post A of a carbon element of any suitable design, which forms no material part of the present invention. This post is hollowed out to form a cup-recess $a'$ and at the bottom thereof a second and deeper recess $a^2$. Into the sides of the recess $a^2$ are drilled oblique holes $a^3$, and a metal plug B is then cast in so as to completely fill the recesses $a^2$ and $a^3$, the metal filling the latter recesses forming lugs $b'$, which effectively prevent the plug from turning in its place or pulling out. The material of the plug should be some metal which expands on cooling, such as for example an alloy of antimony, whereby the metal forces itself more closely and firmly against the carbon walls and tends to force itself into the pores thereof. In the center of the plug B is cast a terminal C which, as shown, projects above the top of the plug into recess $a'$ and is provided on its end with a binding-nut D and washer $d'$, for securing the end of the circuit-wire E as shown. One or more holes $b^2$ are bored longitudinally in the plug after setting, their upper ends being shown enlarged in the drawing so as to leave the holes open at the top. A nonpermeable or impervious liquid, such as oil O, is poured into the cup-shaped recess $a'$, filling the latter and the holes $b^2$, and the porosity of the carbon enables the oil to percolate through the pores thereof at the bottom and around the sides of the plug and thereby absolutely seal the contactual surface against access of corrosive acid. Furthermore the oil competely covers the terminal contact surfaces and so prevents any corrosion thereof. Means such as holes $d^2$ are provided in the top face of the nut D whereby the latter can be easily turned and tightened by the application of a pin-wrench. The top of the recess $a'$ is conveniently provided with a cover F of porcelain, glass or other suitable material, which prevents spilling and evaporation of the oil, said cover having a notch $f'$ at one side to leave exit for wire E and a central hole $f^2$ through which recess $a'$ can be filled with oil from time to time.

In the second form of connector shown in the drawings, the post A and recesses $a'$ and $a^2$ therein are substantially the same as in the first form, but for the cast-plug B is substituted a driven plug G, said plug being made slightly tapered and the recess $a^2$ made slightly tapered to correspond. This plug has fixed therein the terminal-screw C carrying the nut D and washer $d'$ the same as previously, and the recess $a'$ is capped by the cover F as before. It will be observed that the recess $a^2$ is made deeper than the plug G, so that the latter can be driven down tight without contact with the bottom thereof; and the empty space below the plug forms an additional recess for oil, which is connected with the recess $a'$ by a groove $a^4$ formed in the carbon at one side of the plug; whereby the oil has ready access to the bottom of the plug and assists in surrounding and impregnating the surface of the carbon.

In the third form, Figs. 5 and 6, the elements are the same as previously described with the exception that I use a corrugated or star-shaped plug H, which may be either cast or driven; the object gained by the corrugated or fluted form being that a greater extent of surface is provided for a given-sized plug.

In Fig. 7 is shown a carbon element I having a single taper recess $i'$ into which is driven a hollow cup-shaped metal contact-plug J, this latter extending to some distance below the top, whereby the oil O overflows the edge as shown, and thereby penetrates to the bottom. In the bottom of the plug J is fixed the terminal-screw K by pouring in a body of fusible metal, L, thus casting it in place. Holes $j'$ may be bored through the latter and cup J giving the oil direct access to the bottom.

In Fig. 8 I have shown a removable terminal or binding-post M detachably connected by a submerged oil-contact with a hollow tubular contact-plug N, which is permanently mounted in the recess $p'$ of the battery-element P. The plug N has its upper portion $n'$ fitting tightly within the recess $p'$ and a beveled flange on its upper edge, which rests upon the surface of the carbon, and for electrical contact between the metal and carbon I provide a film of electro-plated metal $q$ (this being necessarily shown in the drawing much exaggerated in thickness) which is itself covered to prevent corrosion by a layer of asphalt compound $q'$. The lower portion $n^3$ of the plug N is contracted as shown so as to leave an oil-reservoir $p^2$ outside the plug, this being connected with the interior cup of the plug by holes $n^4$ in the wall of the latter. The bottom of the plug is bored and interiorly threaded to receive the threaded end of the stem $m'$ of the binding-post M, which latter is mounted upon a pedestal or cover R of porcelain, glass, fiber, or like material, and is provided with a threaded boss $r'$ screwing into an interior thread $n^5$ on the upper part of the plug N. On filling the reservoir with oil O the latter escapes into that part of the carbon around the metal contact and thoroughly impregnates it with oil so that the contact-surfaces cannot be reached by acid, and the electrical contact between the terminal M and the plug N is also oil-covered. In this case for greater convenience the connection with the battery-lead E is exterior (here shown in the usual binding-post form of a screw $m^2$ or similar device); so that after the post M has been in use for a time and has become corroded it can be readily unscrewed and replaced by a new one.

In Fig. 10 is shown another method whereby the oil-contact may be secured, the same constituting in this case a plug S of any shape and construction whatever, set in a recess $t'$ of the carbon element T. The latter is formed with an annular channel $t^2$ surrounding the plug S and forming a reservoir for the oil O. To facilitate the impregnation of the carbon by the oil, tubular passageways $t^3$ are bored from the channel $t^2$ to the surface of the plug S, this bringing the oil into direct contact with the surface.

The form of connector shown in Fig. 11 is adapted especially for storage-battery-plates or connecting-bars, a portion of one of which, U, is shown having a post $u'$ at one point of its length, this post being hollowed out interiorly by a recess $u^2$. In the bottom of the recess $u^2$ is a metal sleeve V which is threaded internally to receive the threaded end of the stem $w'$ formed on the terminal W. The side of the stem $w'$ passes through the central hole in a screw-cap X of fiber, rubber or like material, which engages with interior threads $u^3$ in the recess $u'$. The terminal W is formed with an elbow $w^2$ at the base of which is a shoulder $w^3$ which is screwed down upon the surface of the cap X in order to tighten it, and at rightangles to the stem $w'$ is a screw-stem $w^4$ carrying the binding-nut Y and washers $y'$ for the purpose of securing the circuit-lead thereto. The object of making the terminal W with an elbow is to avoid twisting the stem $w'$ in such manner as to tend to loosen the sleeve V of the terminal in its position. In ordinary practice the sleeve V is made of copper and is cast in place in the recess $u'$ on the connecting-bar U, though of course the sleeve may be otherwise placed and secured if desired.

In Figs. 12 and 13 is shown a carbon or graphite element 21 having a cast plug 22 of metal, preferably of metal which expands on cooling so as to force itself into the pores of the carbon. The cavity 23 in the element 21 in which the plug is cast is made undercut so that an upward pull thereon draws it more closely into contact with the element 21 and diminishes the electrical resistance. The upper end of the cavity 23 is made cylindrical and has an annular groove or rabbet 24 in which is set a glass tube 25, said tube resting on a leather gasket 26 and forming in conjunction with the cavity 23 a well for the oil 27, and the joint is sealed by acid-resisting and oil-proof compound 28 packed between the glass and the carbon. On the upper end of the tube 25 is placed a cover 29 which may be made of vulcanized fiber or other noncorrodible material, said cover having an aperture in the center through which passes the stem 30 of the binding-post 31, the stem 30 being threaded at 32 to engage a threaded aperture 33 in the center of the plug 22, so that in securing the binding-post 31 up into place the shoulder 34 at the base of the stem 30 is brought to abut against the cover 29 and the plug 22 is drawn upwardly and thus wedged more tightly into contact with the carbon the harder the binding-post is turned. The binding-post here shown is made tubular and provided with binding-screws 35 on its sides, although any other type may be used if desired. In the plug 22 are bored small passages 36 which permit the oil to pass to the lower side of the plug and thereby assist in distributing the oil over the contact-surfaces; and to prevent the plug 22 from turning in place and thus becoming loose, a pair of small recesses 37 are bored in the bottom of the recess 23 to form anchor-studs 38 on opposite sides of the central axis.

In all carbon or graphite electrodes where the plug is cast in place, I have found it desirable if not essential to treat the element after casting the plug by boiling the projecting post or other portion surrounding the plug in an acid and moisture-repellent compound, as for example paraffin, until the latter has thoroughly impregnated and completely filled the pores of the carbon. This treatment makes the carbon nonporous and thus prevents the oil from diffusing through the carbon beyond the immediate vicinity of its application. In those cases where a taper plug is used which is pushed or driven into place, this impregnation can take place before inserting the plug. After treatment the cavity in the electrode is carefully scraped to remove any surplus compound adhering to its surface.

I have found that the use of an oil protective bath is especially effective in preventing corrosion, electrolytic action and oxidation of the contacts and in making the quality of the electrical contact permanent and unalterable. Contacts which are protected with oil in the manner of my invention show no increase of resistance even after prolonged use and the oil serves the further purpose of lubricating the parts which are screwed or otherwise bound together so that they can at all times be readily separated. I have successfully employed for the purpose a heavy paraffin-oil, but it is obvious that other kinds of oil may be used if desired, and my invention is not limited to the use of any special form of terminal or materials of construction. Other forms than those shown in the drawing and which embrace the same principle will suggest themselves to those skilled in the art and I do not therefore consider my invention further limited than by the reasonable scope of my claims.

Having thus described my invention, what I claim as new and desire to secure by Letters Patent is:

1. In an electric battery, in combination with an electrode of porous material, a member making electrical contact with said electrode, and a bath of nonconducting liquid impervious to an electrolyte, said bath permeating the pores of the electrode and surrounding the contact between said electrode and said member.

2. In an electric battery, the combination of an electrode of porous material having a cavity therein forming a well or reservoir, an acid-resisting material impregnating and filling the pores of said electrode, an electric connecting-member making contact with said electrode within said cavity, and a quantity of nonconducting acid-resisting liquid surrounding said contact and filling the vacant spaces in said cavity.

3. In an electric battery, an electrode of porous material having a cavity therein, an electric connecting-plug socketed in said cavity, and a bath of non-conducting liquid impervious to an electrolyte, said bath permeating the pores of the electrode and surrounding the contact between said electrode and said member.

4. An electrode having a cavity therein forming a well or reservoir, an electric connecting-plug seated in said cavity and forming an electrical connection with said electrode, a quantity of nonconducting, nonpermeable or impervious liquid in said cavity inclosing the exposed-surfaces of the plug, and a terminal member electrically connected in a detachable manner with said connecting-member.

5. An electrode having a cavity therein forming a well or reservoir, an electric connecting-plug seated in said cavity and forming an electrical connection with said electrode, a quantity of nonconducting, nonpermeable or impervious liquid in said cavity inclosing the exposed-surfaces of the plug, a cover closing the mouth of said cavity and having a perforation therein, and a terminal-member having a stem passing through said perforation and detachably engaging said connecting-member below the surface of said liquid.

6. In an electric battery, an electrode having a cavity therein, an electric connecting-plug socketed in the bottom of said cavity and having a threaded portion at the upper end thereof, a member engaging said threaded portion, and a quantity of acid-resisting, nonpermeable or impervious liquid contained in said cavity and surrounding and covering the exposed surfaces of said plug and member within said cavity.

7. In an electric battery, an electrode having a cavity therein, an electric connecting-plug socketed in the bottom of said cavity and having a threaded portion at the upper end thereof, a member engaging said threaded portion, a quantity of acid-resisting, nonpermeable or impervious liquid contained in said cavity and surrounding and covering the exposed surfaces of said plug and member within said cavity, and a cover closing the open end of said cavity.

8. In an electric battery, the combination of an electrode having a cavity therein, a plug socketed in said cavity and having one or more passages from the upper to the lower end thereof, a binding-post on the upper end of said plug, and a quantity of oil in said cavity covering the exposed surfaces of said binding-post and plug.

9. In an electric battery, the combination of an electrode of porous material having a cavity therein, an electric-connecting plug socketed in said cavity, said plug having a passageway from the top to the bottom of said cavity whereby to conduct oil to the lower surface of said cavity, a terminal on said plug, and a quantity of oil filling said cavity, surrounding said terminal, and impregnating the pores of said electrode surrounding the contact-surfaces.

10. In an electric battery, in combination with an electrode having a cavity therein, the lower portion of said cavity being undercut, an electric connector in the form of a plug filling the under-cut portion of said cavity and having a threaded aperture, a tubular member mounted on said electrode concentric with said cavity and forming an extension thereof at the top, a cover fitting over the top of said tubular member and having a central aperture, a terminal member seated on said cover and having a threaded stem passing through the aperture thereof and engaging in the threaded aperture of said connector, and a quantity of oil in the reservoir formed by said cavity and tubular member.

11. In an electric battery, in combination with an electrode having a cavity therein, the lower portion of said cavity being undercut, an electric connector in the form of a plug filling the under-cut portion of said cavity and having a threaded aperture, a tubular member mounted on said electrode concentric with said cavity and forming an extension thereof at the top, a cover fitting over the top of said tubular member and having a central aperture, a terminal member seated on said cover and having a threaded stem passing through the aperture thereof and engaging in the threaded aperture of said connector, and a quantity of oil in the reservoir formed by said cavity and tubular member; said connector having one or more passageways extending from the top to the bottom thereof at the sides of the central threaded aperture, thereby assisting oil to pass to and impregnate said electrode in the parts surrounding the contact-surfaces.

12. In an electric battery, in combination with an electrode having a cavity therein the lower portion of which is conically undercut, an electric connector in the form of a conical frustum filling the undercut portion of said cavity and having a central threaded aperture and one or more passageways from top to bottom at the side of said aperture, the upper edge of said cavity being rabbeted, a gasket of packing material seated in the rabbet, a tubular member of noncorrosive material such as glass seated on said gasket and cemented around the periphery to said electrode, a cover closing the upper end of said tube and having a central aperture, a terminal member having a shoulder seated on said cover and a threaded stem passing through said central aperture and engaging the threaded aperture in said plug, and a quantity of oil in the reservoir formed by said cavity and tube combined.

In witness whereof I have hereunto set my hand this 19th day of January, 1909.

JULIUS H. GUGLER.

Witnesses:
GEORGE W. COLLES,
MINNIE D. SCHIENBEIN.